(12) United States Patent
Hargis et al.

(10) Patent No.: US 9,093,945 B2
(45) Date of Patent: Jul. 28, 2015

(54) FAIL-SAFE INTERFACE

(71) Applicant: Control Techniques Limited, Newtown (GB)

(72) Inventors: Colin Hargis, Oswestry (GB); Richard Mark Wain, Newtown (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 178 days.

(21) Appl. No.: 13/856,241

(22) Filed: Apr. 3, 2013

(65) Prior Publication Data

US 2013/0264985 A1    Oct. 10, 2013

(30) Foreign Application Priority Data

Apr. 5, 2012    (GB) .................................. 1206259.2

(51) Int. Cl.
| | |
|---|---|
| *H02P 6/00* | (2006.01) |
| *H02P 6/14* | (2006.01) |
| *H02P 27/08* | (2006.01) |
| *H02M 1/32* | (2007.01) |
| *H02M 3/155* | (2006.01) |
| *H02M 7/5387* | (2007.01) |

(52) U.S. Cl.
CPC ................ *H02P 27/08* (2013.01); *H02M 1/32* (2013.01); *H02M 3/155* (2013.01); *H02M 7/5387* (2013.01)

(58) Field of Classification Search
CPC ........................... H02M 3/3353; H02M 3/3372

USPC ...................................................... 318/400.42
See application file for complete search history.

(56) References Cited

U.S. PATENT DOCUMENTS

| | | | | |
|---|---|---|---|---|
| 8,030,788 | B2 * | 10/2011 | Xu et al. .......................... | 290/31 |
| 8,395,910 | B2 * | 3/2013 | Alexander ...................... | 363/17 |
| 8,587,238 | B2 * | 11/2013 | Maiocchi .................... | 318/400.3 |

FOREIGN PATENT DOCUMENTS

| | | |
|---|---|---|
| EP | 0746186 | 12/1996 |
| EP | 0955793 | 11/1999 |
| JP | 8-321389 | 12/1996 |

* cited by examiner

*Primary Examiner* — Erick Glass
(74) *Attorney, Agent, or Firm* — Harness, Dickey & Pierce, P.L.C.

(57) ABSTRACT

Circuits arranged to produce first and second outputs produced by first and second switch-mode converters, respectively, wherein each switch-mode converter comprises a converter input, a converter output, a converter controller, a converter controller enable input arranged to provide power to the controller, and a semiconductor power switching device coupled between the converter input and the converter controller. A first output of the first converter and a second output of the second converter are each arranged to produce a voltage of higher magnitude than the voltage at the respective converter controller enable input and converter input when the converter controller is enabled. Methods of controlling first and second outputs from first and second switch-mode converters are also disclosed.

19 Claims, 5 Drawing Sheets

FAIL-SAFE INTERFACE

CROSS-REFERENCE TO RELATED APPLICATION

This application claims the benefit and priority of Great Britain Patent Application No. 1206259.2, filed Apr. 5, 2012. The entire disclosure of the above application is incorporated herein by reference.

FIELD

This invention relates to a fail-safe interface. It is particularly suitable for an inverter disable input, and especially suited to an inverter disable input for a motor drive.

BACKGROUND

Machinery often comprises parts, which, during normal operation, would be hazardous to an operator should the operator come into contact with those parts when they are moving.

Such machinery is often driven by an electric motor. For safety reasons, it is often a requirement that a control system be employed for allowing and preventing operation of the electric motor (and hence machine operation) with a high level of integrity. For example, when a safety guard or gate is opened to allow access to a part of a machine that would be hazardous when moving, the motor must be prevented from driving the machine. A typical level of integrity for such a function would be a probability of dangerous failure on demand of the order of $10^{-8}$ per hour. To achieve this, circuit design is employed that ensures that most component failures and combinations of failures result in the motor being prevented from driving the machine and, in turn, the machine not operating.

Traditionally, the ability to enable or disable the operation of the electric motor is achieved with electromechanical contactors, at least two of which would be arranged in series with the motor. The contactors are typically provided with auxiliary monitoring contacts so that an incorrect position of the main contacts of one contactor could be detected, and completion of the circuit prevented by disconnecting both coils of the electromagnets of the contactors.

Recently, solid-state controllers that drive an inverter to convert the d.c. supply into a phased set of a.c. supplies to produce a rotating magnetic field in the motor have been equipped with safety-related inputs. The inputs allow the operation of the motor to be prevented by electronic means.

In order to maintain torque in the motor, continual active and co-ordinated switching in the required sequence of the corresponding power semiconductors is needed. Should erroneous conduction of one or more of the power semiconductor devices of the inverter occur, this does not result in sustained torque in the motor. For a motor with a smooth (non salient) rotor, no torque is produced by any failure of a power semiconductor device of the inverter. For a motor with permanent magnets and/or saliency, a pair of short circuit power semiconductor devices in the inverter could cause a brief alignment torque whereby the motor partially rotates, however, the current would increase rapidly until interrupted by a protection device (for example a fuse) or destructive failure of at least one of the power semiconductor devices.

As a further example, in power grid-connected power generating inverter applications, the same principles apply when the inverter drives a transformer rather than a motor. Erroneous conduction of power semiconductor devices of the inverter cannot produce an alternating flux in the transformer, and therefore cannot produce a sustained output from the transformer secondary coil. In other words, a fault in the inverter power device results in direct current, which cannot be transferred through the transformer because the transformer relies upon alternating current for its operation.

In order for safe and reliable control of such an inverter, an interface is required between the inverter control input terminals which typically use logic signals such as 24V d.c. and the power semiconductors of the inverter that maintains the required low probability of dangerous failure of the inverter.

Electromechanical relays have been used to provide the necessary electrical isolation and electrical level conversion for such an interface. However, relays possess relatively high probabilities of failure in the dangerous direction and have a relatively short time before mechanical wearout. This results in pairs of relays being used accompanied by monitoring to detect fault conditions.

Recently, generation of the power semiconductor control signals for operating the inverter is typically carried out by complex digital electronic circuits and programmable digital processors. Such an arrangement does not provide the required low probability of dangerous failure as most digital circuits can fail with equal probability into either of the available logic states. Further, the complexity of the digital circuits and functions is such that it is difficult to reliably and confidently demonstrate a sufficiently low probability of dangerous failure under all combinations of conditions and sequences of conditions that the circuit may be subjected to during operation. For example, it may be difficult to predict how the circuit reacts under changeable temperature conditions together with each and every possible sequence of combinations of logic levels on each and every pin of the various devices of the circuit.

If complex digital electronic circuits and programmable circuits are to be employed in safety critical functions, typically, at least two independent channels together with diagnostic and cross-checking functions to detect faults or errors are used. These systems allow the disabling of an inverter by way of a channel that is not affected by a particular fault that has been detected. As can be seen, even in such systems, means for disabling the inverter which do not rely on the complex circuits needs to be provided in order to achieve the required low probability of dangerous failure.

It is therefore desirable to have a fail-safe interface, in particular, to an inverter, which employs simple electronic components with well-defined failure modes. In such an interface, it is desired that a very high fraction of component faults, and combinations of component faults, result in a safe failure. In other words, a failure where the inverter is not provided with the required waveform, and hence a motor connected to the inverter is not driven.

The same approach applies to power generators using inverters, in cases where under certain conditions, it is necessary to prevent the operation of the inverter with a high level of integrity. This could be, for example, when the part of a public power distribution network fed by an inverter has become separated from the main body of the power network and must be disabled.

SUMMARY OF THE INVENTION

According to a first aspect of the present invention there is provided a circuit as defined in Claim 1 of the appended claims. Thus there is provided a circuit arranged to produce first and second outputs, the outputs being produced by first and second switch-mode converters respectively, wherein each switch-mode converter comprises a converter input, a converter output, a converter controller, a converter controller enable input arranged to provide power to the controller, a semiconductor power switching device coupled between the converter input and the converter controller, and wherein a first output of the first converter and a second output of the second converter are each arranged to produce a voltage of higher magnitude than the voltage at the respective converter controller enable input and converter input when the converter controller is enabled.

By arranging the first and second outputs to drive, for example, isolators of an inverter input, a robust and reliable enable/disable function of a downstream device is achieved. Should the higher magnitude outputs be removed (by disabling the converter controller) the subsequent circuit that the first and second outputs drive does not operate. Further, no fault in the system can inadvertently provide a higher magnitude output when the converter controller is disabled. Therefore, a robust and reliable enable/disable function of a downstream device is achieved.

Optionally, the converter controller input also provides power to the converter input which further enhances the reliable enable/disable function by removing a power rail which could be involved in a failure mode and further, rendering the circuit design more simple.

Optionally, at least one isolator device is arranged to produce an output when coupled between the first voltage output and the first converter input, and at least one other isolator device is arranged to produce an output when coupled between the second voltage output and the second converter input. By providing such an arrangement, the isolator devices only have a power supply when the first and second outputs are enabled. Thus, subsequent downstream circuitry which is driven by the output of the isolator devices is only operable when the first and second outputs are enabled. By providing reliable enable/disable of the first and second outputs, reliable operation of subsequent circuitry, for example, a motor driven by an inverter which is, in turn, driven by the isolator devices is achieved.

Optionally, the inverter is arranged to drive a motor; and further optionally the PWM controller is arranged to couple each isolator device in sequence to drive the motor.

Optionally, the inverter comprises a polyphase inverter; and further optionally the output of the at least one isolator device coupled between the first voltage output and the respective converter input is arranged to drive a first portion of the polyphase inverter, and wherein the output of the at least one isolator device coupled between the second voltage output and the respective converter input is arranged to drive a second portion of the polyphase inverter.

Optionally, the first and second voltage outputs are of equal magnitude and/or the first and second voltage outputs are of opposite polarity. By providing the two outputs, each controlled by an independent enable/disable input, verification and cross-checking of the enable/disable signals is also provided for an additional check on correct operation and reliability of the operation of the outputs.

Optionally, one of the first and second switch-mode converters comprises a flyback converter.

Optionally, one of the first and second switch-mode converters comprises a forward converter.

Optionally, the isolator devices comprise opto-isolators.

According to a second aspect of the present invention there is provided a method as defined in claim 11 of the appended claims. Thus there is provided a method of controlling first and second outputs from first and second switch-mode converters, the method comprising providing each switch-mode converter with an input voltage, providing a converter controller of each switch-mode converter with power from a converter controller enable input, coupling a semiconductor power switching device of each switch-mode converter between the converter input and the controller of each switch-mode converter, enabling the converter controller and thereby producing a first output of the first converter and a second output of the second converter that are each of a higher magnitude than the voltage at the respective converter controller enable input and converter input.

Optionally, at least one isolator device is arranged to produce an output when coupled between the first voltage output and the first converter input, and at least one other isolator device is arranged to produce an output when coupled between the second voltage output and the second converter input.

Optionally, the outputs of the isolator devices are arranged to drive an inverter.

Optionally, the method further comprises controlling the coupling of each of the isolator devices between the respective voltage output and converter input with a PWM controller and a switching device.

Optionally, the inverter is arranged to drive a motor; and further optionally the PWM controller is arranged to couple each isolator device in sequence to drive the motor.

Optionally, the inverter comprises a polyphase inverter; and further optionally the output of the at least one isolator device coupled between the first voltage output and the respective converter input is arranged to drive a first portion of the polyphase inverter, and wherein the output of the at least one isolator device coupled between the second voltage output and the respective converter input is arranged to drive a second portion of the polyphase inverter.

Optionally, the first and second voltage outputs are of equal magnitude and/or wherein the first and second voltage outputs are of opposite polarity.

Optionally, one of the first and second switch-mode converters comprises a flyback converter.

Optionally, one of the first and second switch-mode converters comprises a forward converter.

Optionally, the isolator devices comprise opto-isolators.

Further optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

OVERVIEW

Figure 1:
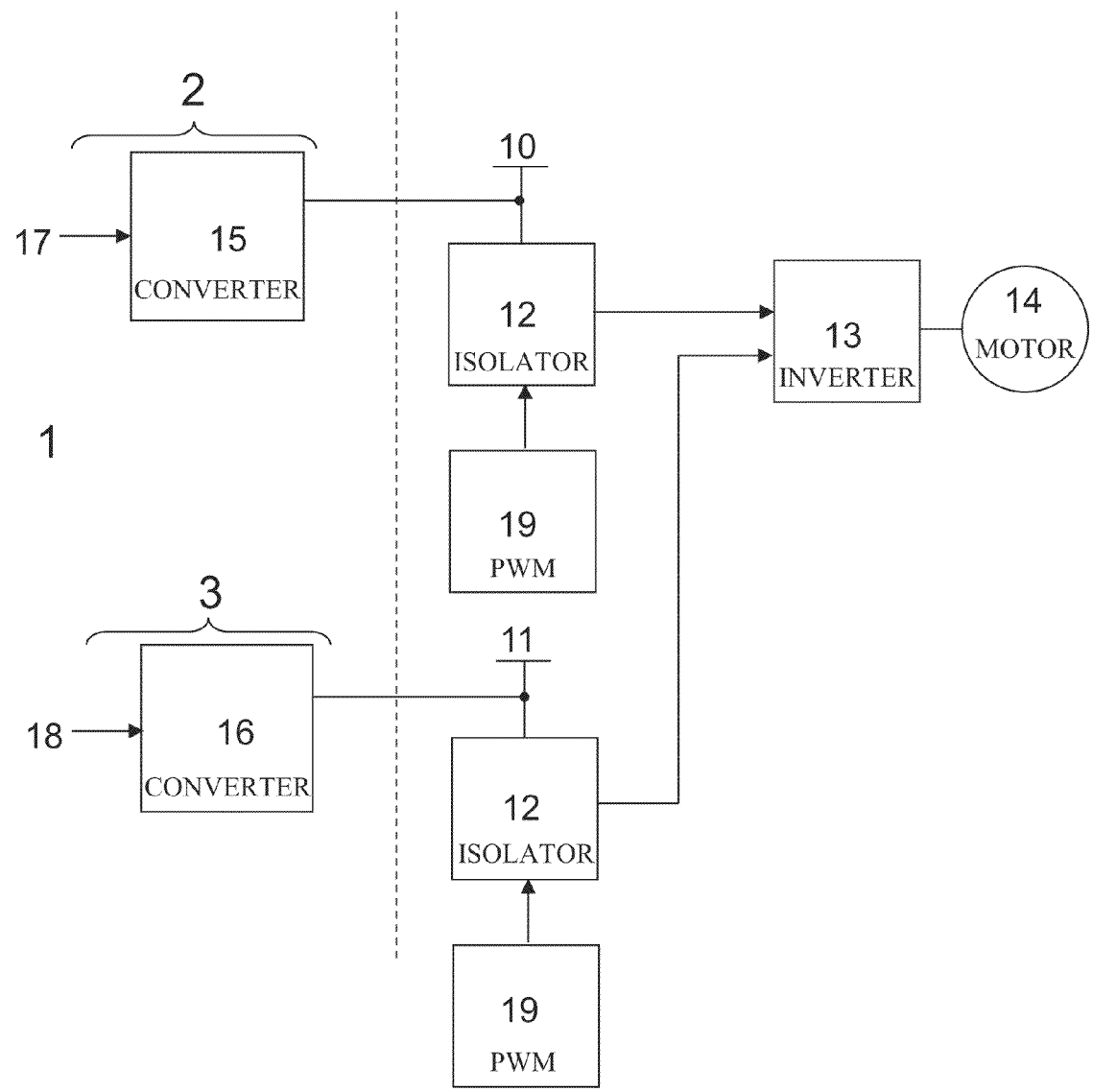
FIG. 1 illustrates a system overview diagram in accordance with embodiments described herein.

In overview, a fail-safe interface 1, denoted by the left hand side of the dotted line of FIG. 1, provides a reliable enable/disable function of at least two outputs 10, 11. These outputs may each power one or more isolators 12 that, in turn, may drive an electric motor 14 by way of an inverter 13. The reliable enable/disable function is provided by two switch-mode converters 15, 16 that each produce one of the outputs 10, 11 known as boost voltage outputs (+ve or −ve) that are both higher in magnitude than any other power rail in the fail-safe interface. At least one isolator component 12 may be coupled to each boost voltage output 10, 11 in a manner so that, without the presence of the boost voltage which is determined by an enable input 17, 18 of each switch-mode converter, the respective isolator component 12 cannot operate. With no isolator output, the correct sequence of voltages and currents cannot be produced in the inverter 13 and hence, an electric motor 14 cannot be driven by the inverter 13.

The circuit is arranged so that when an enable input 17, 18 is in the disable state, no failure can result in both switch-mode converters 15, 16 producing their respective boost outputs 10, 11. With no boost output, even if an attempt is made to switch an isolator 12 in the required sequence for the inverter 13, for example by a PWM 19, the isolator cannot produce an output due to the arrangement of the isolator and the respective boost voltage output 10, 11.

Accordingly, a two channel fail-safe interface is provided where each channel 2, 3 can be independently enabled and disabled. Each channel 2, 3 comprises the safety-related parts for the fail-safe interface as will be discussed further herein.

A Solid-state drive which operates an a.c. motor or a brushless d.c. motor (a type of a.c. motor) is particularly suited to the fail-safe interface where the drive uses an inverter 13 to convert the d.c. supply into a phased set of a.c. supplies to produce a rotating magnetic field in the motor 14.

DETAILED DESCRIPTION

Enable/Disable Function of Boost Outputs 10, 11

Figure 2:
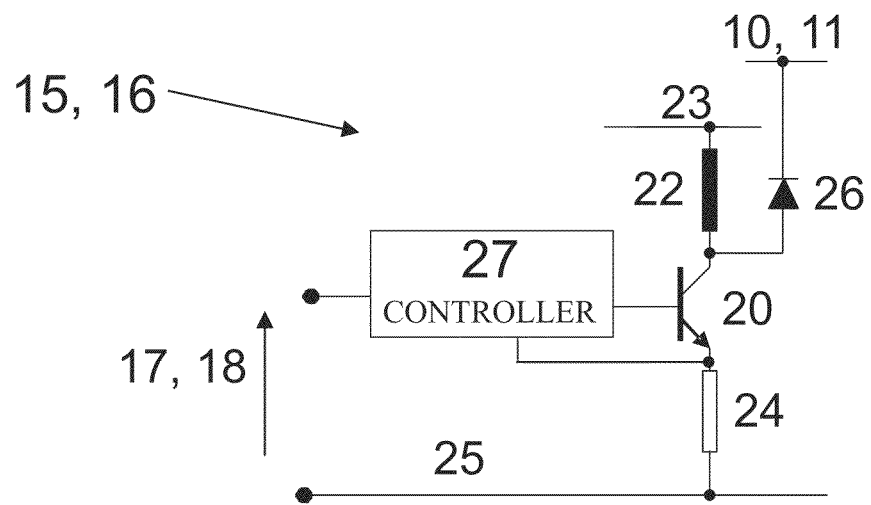
FIG. 2 illustrates one channel of the two channel fail-safe interface providing a positive boost output according to embodiments described herein.

FIG. 2 shows one arrangement of a single channel of the two-channel fail-safe interface. A single power semiconductor switching device 20, inductor 22, resistor 24 and diode 26 are arranged as a boost switch-mode converter 15, 16 in flyback mode as would be understood by the skilled person. Switching device 20 is shown as a bipolar transistor however, alternatively, a MOSFET or any other suitable switching device could be used.

The converter input is provided by rails +Vcont 23 and −Vcont 25. In the arrangement of FIG. 2, +Vcont is a more positive voltage than −Vcont and typically, −Vcont is at ground potential. Switching device 20 is coupled between the converter input +Vcont 23 and controller 27. Controller 27 provides switching of switching device 20 so that the switch-mode converter outputs a positive voltage on Vboost rail 10, 11 as would be understood by the skilled person. This voltage is of a higher magnitude than the magnitude of +Vcont, −Vcont and enable input 17, 18.

It will be noted that the power for controller 27 is provided by the enable input 17, 18.

This input may be a d.c. logic input. Controller 27 may comprise an oscillator to switch the converter power device 20. Controller 27 may comprise a dedicated controller IC or other oscillator such as a 555 timer and associated support components, or may comprise discrete components including logic gates and/or transistors.

Alternatively, the enable input may also provide power to the converter input.

Figure 3:
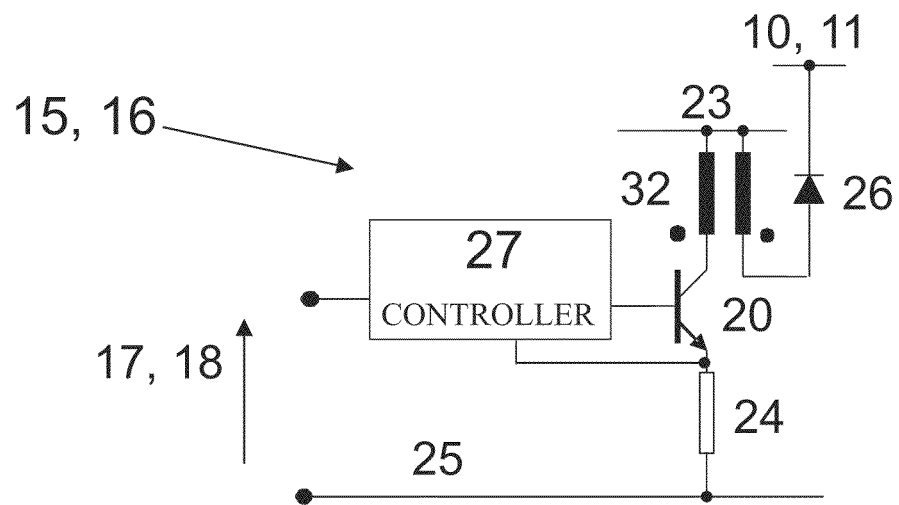
FIG. 3 illustrates one channel of the two channel fail-safe interface providing a positive boost output according to embodiments described herein.

Turning to FIG. 3, a further arrangement of a single channel providing a positive voltage on Vboost rail 10, 11 is shown. In this arrangement, the boost switch-mode converter in flyback mode comprises a transformer 32 as would be understood by the skilled person. For like numbered references, see the description of FIG. 2.

Alternatively, switch-mode converters in forward mode may be employed to produce the Vboost output. Such an arrangement could be illustrated by the dot notation of the transformer being at the top end of the secondary winding in FIG. 3 as would be understood by the skilled person.

FIGS. 2 and 3 show arrangements for a single channel of the two-channel fail safe interface that provides a positive Vboost output 10, 11 of a higher magnitude than +Vcont 23, −Vcont 25 and the enable input 17, 18.

Figure 4:
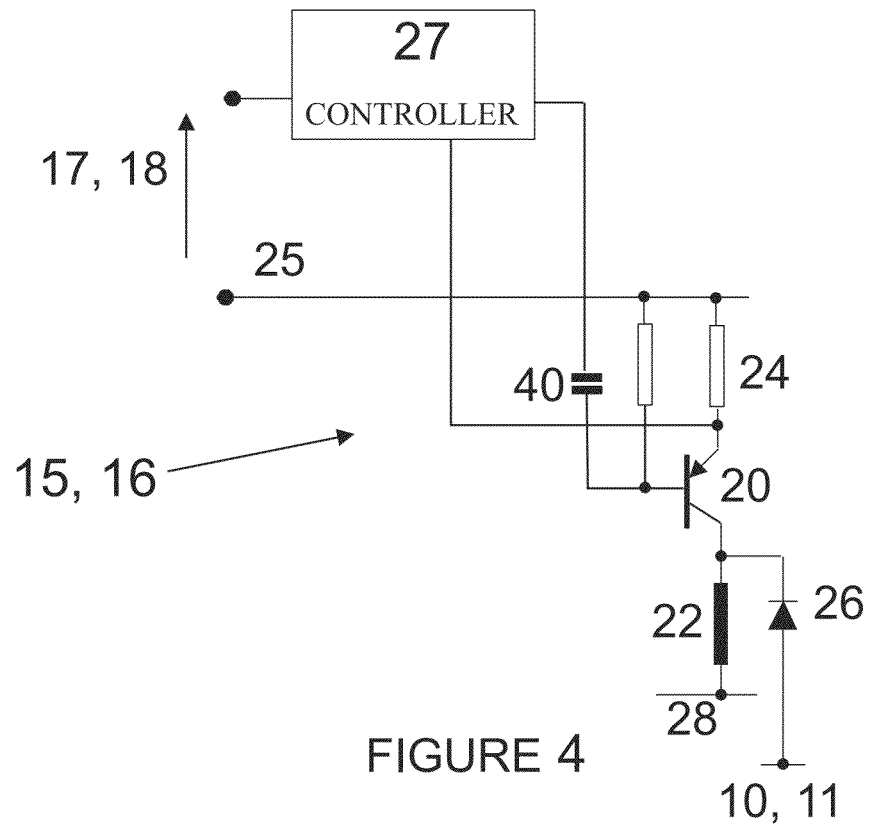
FIG. 4 illustrates one channel of the two channel fail-safe interface providing a negative boost output according to embodiments described herein.
Figure 5:
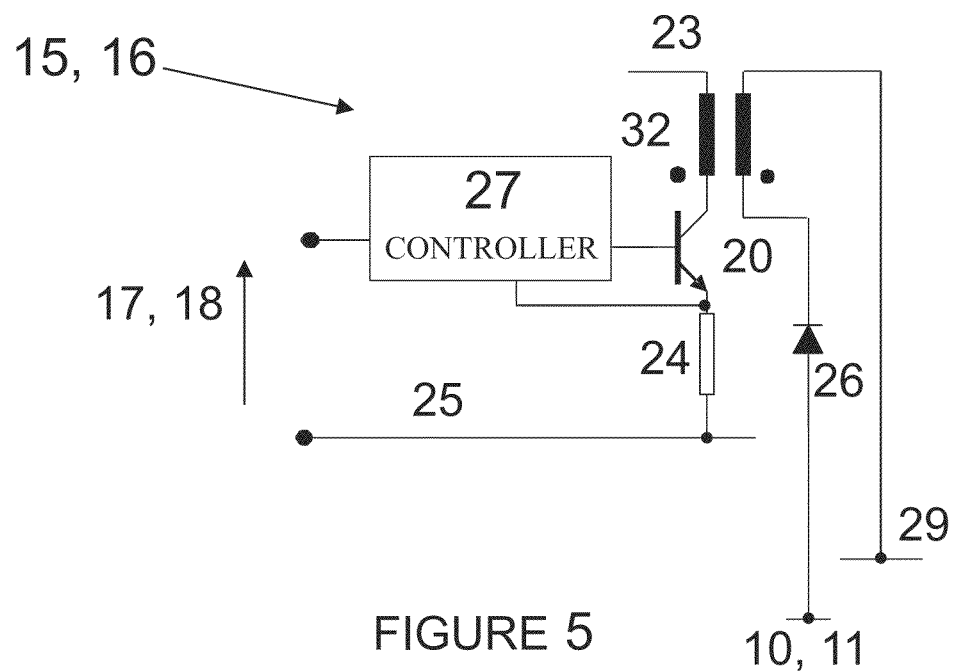
FIG. 5 illustrates one channel of the two channel fail-safe interface providing a negative boost output according to embodiments described herein.

As discussed in the overview section, Vboost may comprise a negative voltage. FIGS. 4 and 5 show arrangements where the Vboost rail is of a higher negative magnitude than the converter input and the enable input 17, 18 in a similar manner as FIGS. 2 and 3.

FIG. 4 shows an inversion of FIG. 2. The converter input is provided by rails Vcont 25 and Vcont 28 which is more negative than Vcont 25. Capacitor 40 couples the controller 27 output into the switching device 20, which in this arrangement comprises a pnp transistor.

FIG. 5 comprises an adaption of the arrangement of FIG. 3 with an additional negative rail 29 to provide a negative Vboost output 10,11. Alternatively, an inversion of FIG. 3 could provide a negative Vboost output 10,11 in the same manner as FIG. 4.

By combining any of the arrangements of FIGS. 2 to 5, a two-channel fail-safe interface is achieved. Such an interface is shown in FIG. 1, denoted by channels 2, 3. The Vboost outputs 10, 11 provided by the switch-mode converter 15, 16 of each channel may comprise two positive outputs, two negative outputs, or an output of each polarity.

FIGS. 2 to 5 show resistor 24 that may be used to measure current in the power semiconductor switching device 20 with feedback to the controller 27. This feedback aids correct operation of the respective channel under normal (non-faulty) conditions when enabled by preventing the current exceeding the ratings of the power components without compromising integrity of the fail-safe interface.

Fail-Safe Inverter Disable Input

Figure 6:
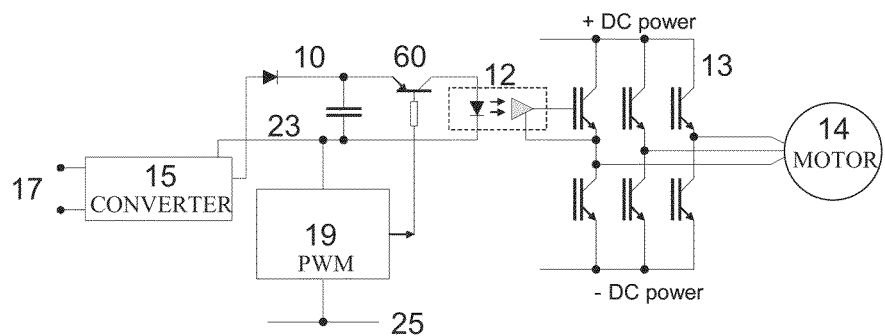
FIG. 6 illustrates a system diagram of one channel of the two-channel fail-safe interface providing a disable input of a portion of an inverter according to an embodiment.

FIG. 6 shows a system diagram of an example of one channel of the two-channel fail-safe interface providing an inverter disable input. The Vboost output 10 is of a positive polarity in FIG. 6. An isolator 12 may be coupled between the Vboost output 10 and the +Vcont rail 23. Isolator 12 may comprise an opto-isolator with an LED as shown in FIG. 6, or may be any similar device capable of producing light or other electromagnetic energy, or any other device capable of providing electrical isolation. The LED may have its cathode coupled to the highest positive supply rail (Vboost) by a discrete switching device 60. Switching device 60 may be a bipolar transistor, a MOSFET or any other suitable device. PWM 19 provides coupling of the LED cathode to Vboost via switching device 60 and is operable to modulate the isolator 12 output. Any suitable means of modulation may be used in place of PWM 19 such as voltage vector control or flux vector control where the pulse widths are adjusted using a variety of techniques to optimise an aspect of the behaviour of the motor or the load. These alternatives provide pulses with modulated width. Another suitable modulation technique is quasi-square operation, i.e. without width modulation.

As can be seen, the LED of the opto-isolator can be illuminated only when the Vboost output 10 is enabled by the corresponding enable input 17. Even if the PWM 19 attempts to couple the LED to Vboost 10, the isolator cannot provide an output without Vboost voltage 10 being present.

Figure 7:
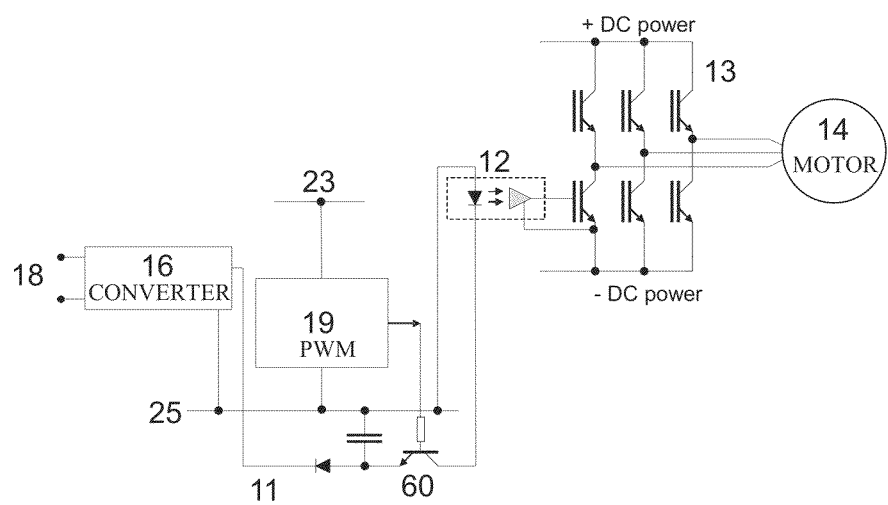
FIG. 7 illustrates a system diagram of one channel of the two-channel fail-safe interface providing a disable input of another portion of an inverter according to an embodiment.

Should the isolator 12 be coupled to a power semiconductor of an inverter 13, then it is clear that, without the Vboost output 10, the power semiconductor cannot be driven, and hence the inverter cannot provide the required waveform to a connected motor 14. In FIGS. 6 and 7, only one isolator is shown for clarity however additional isolators can be coupled to the other power semiconductors of the inverter in a similar manner.

Any isolator 12 or other device connected in a manner corresponding to FIG. 6 is disabled when VBoost 10 is not present. The arrangement of FIG. 6 can be utilised with a three-phase inverter bridge 13 as shown, however, any polyphase inverter can be driven in this manner. Therefore, if motor torque is only produced when an approximation to the correct sequence of voltages and currents is generated, the reliable and fail-safe enable function of Vboost provides reliable and fail-safe operation of motor 14 driven by inverter 13.

FIG. 7 shows a system diagram of an example of one channel of the two-channel fail-safe interface providing an inverter disable input where the Vboost output 11 is of a negative polarity. Control of the inverter 13 by way of enable input 18 and isolator 12 is achieved in the same manner as that shown in FIG. 6.

With a three-phase inverter bridge 13, as shown in FIGS. 6 and 7, two channel fail-safe control can be achieved by coupling isolators 12 to either Vboost output 10 or Vboost output 11.

Figure 8:
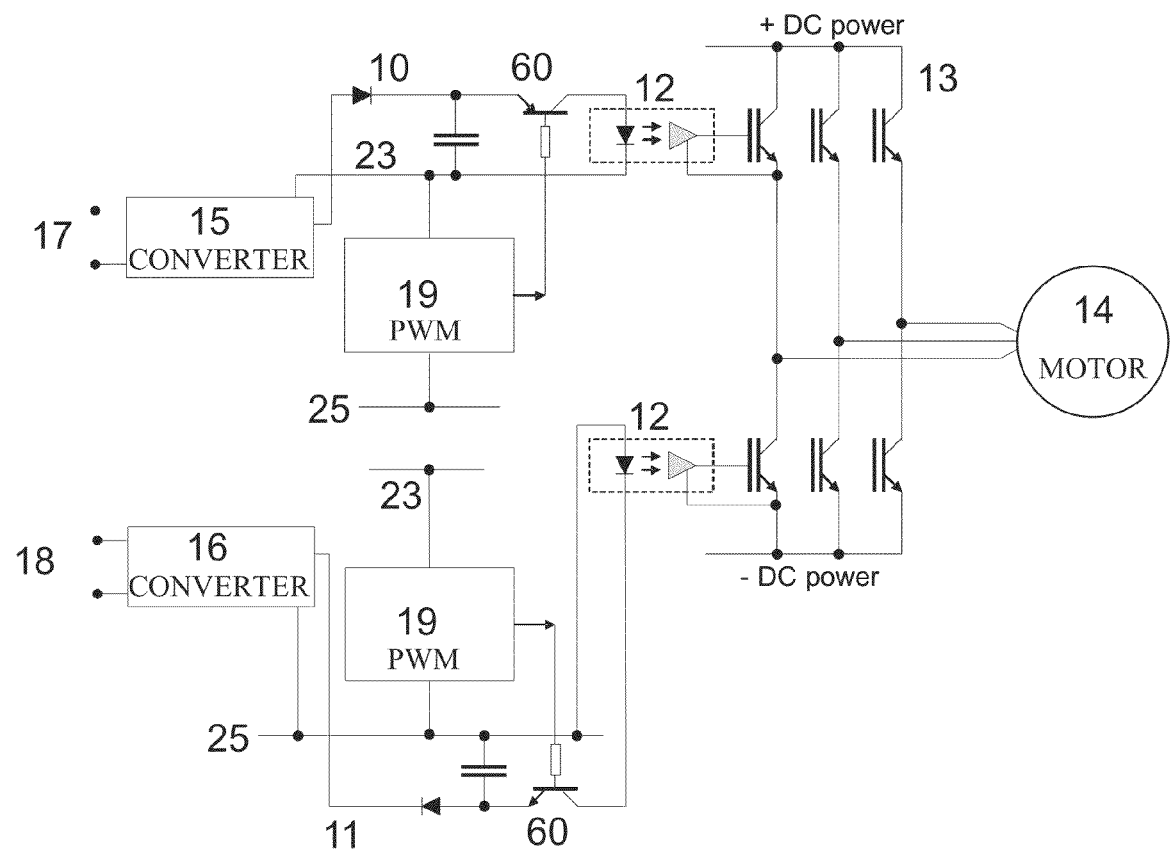
FIG. 8 illustrates a system diagram of a two channel fail-safe interface according to an embodiment.

Turning to FIG. 8, Vboost outputs 10, 11 may comprise two positive boost outputs, two negative boost outputs, or a boost output of each polarity. FIG. 8 illustrates the arrangement when Vboost 10 is positive and Vboost 11 is negative.

As shown, the two independent channels 2, 3 each control the Vboost output for three of the six power semiconductor devices of inverter 13. Independence of the two channels is obtained by segregating the components of FIGS. 2 to 5 as described in the failure mode section below.

The top three power semiconductors of the inverter may be controlled by three isolators 12 coupled to Vboost 10 by three corresponding switching devices 60 (only one such isolator is shown for clarity), and the bottom three power semiconductors of the inverter may be controlled by three isolators 12 coupled to Vboost 11 by three corresponding switching devices (only one such isolator is shown for clarity).

With such a two-channel arrangement, both enable inputs 17, 18 must be in the enabled state for the corresponding Vboost output to be produced which, in turn, allows the isolator to produce an output to drive the corresponding power semiconductor of the inverter. A cross-check can be performed between the separate enable outputs 17, 18 for indication of a malfunction. Any mismatch between the two channels and the fail-safe interface could be shutdown.

The isolators 12 are illustrated as opto-isolators. However, alternative isolators comprising transformers or capacitance coupling arrangements could also be employed in the fail-safe interface.

Failure Modes

Various potential failure modes will now be described where a dangerous fault could affect the integrity of the fail-safe interface. It will be shown that no fault can reduce the integrity of the enable/disable function.

All components in the converter 15, 16 shown in FIGS. 2 to 5 may be discrete parts that posses well-defined failure modes (for example short circuit, open circuit, leakage, value change with time and temperature etc).

The Controller 27 has no supply of power other than through the corresponding enable input 17, 18, and is arranged so that there are no component faults within the Controller 27 that could cause inadvertent switching of the semiconductor power switching device 20 if the enable input 17, 18 is not in the enable state (as the Controller would have no power). Transfer of power to each Vboost output 10, 11 relies upon the continual active switching of the semiconductor power switching device 20. There are no component faults which result in the Vboost rail being energised when the enable input 17, 18 is in the disable state as there are no components in the controller that are directly connected to power sources. The only effect from any fault would be a loss of power as explained below.

A short circuit or leakage from an existing d.c. supply such as but not limited to the Vcont rail 23, 25 to the enable input 17, 18 could impact the integrity of the enable function. The circuit may be arranged so that there are no components connected to such a supply and hence there can be no dangerous component faults resulting in enablement of a converter 15, 16 without the enable signal 17, 18 being in the enable state. During PCB or other circuit layout, the possibility of a short circuit between conductors of a d.c. supply and the enable input can be minimised by suitable segregation, guarding and insulation of any PCB or circuit nodes where a short circuit could lead to a dangerous fault.

As can be seen from FIGS. 2 to 5, power semiconductor switching device 20 is coupled between the Vcont rails 23, 25 and 28 and the controller 27, illustrated as a bipolar transistor. A short circuit or leakage between the transistor collector and base terminals could potentially supply power to the Controller 27. However, this same short circuit or leakage would, if sufficient to operate the controller, also cause the transistor to conduct continuously. Therefore, either the circuit would disable itself by way of there being no switching of the power semiconductor switching device 20 as the transistor would be conducting continuously, or the transistor would be destroyed as typically, this fault would result in the operation of the transistor in its linear mode, whilst it is intended to be in switching mode, leading to its destruction through excessive power dissipation. In either event, the converter 15, 16 would not function and hence the corresponding Vboost output 10, 11 would not be energised, thus resulting in no isolator 12 output and the motor 14 remaining in the disabled state.

The fail-safe interface 1 can be used in conjunction with an external programmable safety system (for example a microprocessor system). The switching requirements of each switch-mode converter 15, 16 which have so far been described as being provided by controller 27 can be utilised in a similar way to a hardware watchdog as is described briefly below.

In place of each controller 27, of each switch-mode converter 15, 16, the switching pulses for the power semiconductor switching device 20 could be derived from a processor digital output controlled by software. If the digital output is switched at appropriate parts of the software cycle then provided the necessary disciplines are respected in the creation of the software, the independent channels of the fail-safe interface would remain fail-safe. Any faults or processor errors which result in the digital output being "stuck", in either the high or low state, would have the same effect as disabling controller 27 of each switch-mode converter which, in turn, would safely disable any connected inverter 13.

As has been disclosed herein, there is provided a fail-safe interface which allows low-level control signals 17, 18 to reliably enable and disable the power semiconductor devices 13 of an inverter drive. The following advantages are realised:

1. All of the safety-related components are contained in a single circuit comprising two independent channels 2, 3. These channels may be positioned on a discrete circuit board together (with PCB layout discipline to avoid one Vboost being able to leak onto another), or for added resilience to failure, on one discrete circuit board per channel. As has been shown, no faults or combinations of faults in any other circuit that is used with the fail-safe interface can result in unintended production of Vboost 10, 11 and hence unintended torque in motor 14.
2. In the embodiment where the two channels produce Vboost outputs of opposite polarity, no other circuit can exhibit a fault that is able to cause one Vboost output to be energised because the other is energised. In this embodiment, if an energised Vboost was to leak onto an unenergised Vboost, the isolators 12 on the unenergised VBoost would require a Vboost of opposing polarity to that provided by the leaking Vboost output in order to be biased correctly for operation. When opposing Vboost polarities are used, the PCB layout discipline when both channels are positioned on the same circuit board may therefore be relaxed as even if one Vboost leaks onto the other, erroneous isolator 12 output cannot occur.
3. The fail-safe interface can be used with many inverter designs, and further, the portions of the overall circuit arranged to control the inverter drive need not be assessed in detail for their failure effects as they will have no effect on the integrity of the fail-safe function of the two channels 2, 3.
4. All of the safety-related parts of the two channels 2, 3 may be common electronic components for which mature failure rate data exists, and for which the failure modes are well-defined.
5. When coupled to an inverter bridge 13 via an isolator 12, no single component failure and no combination of two independent component failures can result in unintended production of Vboost 10, 11 and hence unintended production of torque in the motor 14.

Described herein is a fail-safe interface comprising a safe and reliable enable function provided by way of discrete components with well-defined failure modes. The interface does not require complex circuits or architecture, nor electromechanical devices that are inherently unreliable, have a short life expectancy, and are expensive.

Whilst particular embodiments and arrangements have been illustrated and described herein, other arrangements are possible without departing from the scope of the invention as set out in the claims.

For example, more than two channels could be combined to provide a higher degree of cross-checking. Further, the single semiconductor switching device could be replaced by an arrangement of cascade or series pairs such as Darlington or Cascode whilst retaining integrity of failure. Alternative switch-mode topologies suitable for providing the Vboost output in the fail-safe interface as described herein include those arrangements comprising the properties that most component faults cause a loss of output, and few or no component faults cause an output to occur unexpectedly.

The invention claimed is:

1. A circuit arranged to produce first and second control outputs of a fail-safe interface for an inverter, the circuit comprising first and second switch-mode converters, wherein each switch-mode converter comprises:
    a converter input;
    a converter output;
    a converter controller;
    a converter controller enable input arranged to provide power to the controller; and
    a semiconductor power switching device coupled between the converter input and the converter controller;
    wherein a first voltage output of the first converter and a second voltage output of the second converter are each arranged to produce a voltage of higher magnitude than the voltage at the respective converter controller enable input and converter input when the converter controller is enabled, wherein at least one isolator device is arranged to produce the first control output when coupled between the first voltage output and the first converter input, wherein at least one other isolator device is arranged to produce the second control output when coupled between the second voltage output and the second converter input, and wherein the first and second control outputs are arranged to drive the inverter.

2. The circuit according to claim 1 wherein the converter controller enable input is arranged to provide power to the converter input.

3. The circuit according to claim 1 wherein each converter controller is arranged to switch the respective semiconductor power switching device so as to provide the respective first or second voltage output.

4. The circuit according to claim 1 wherein the isolator devices comprise electromagnetic devices.

5. The circuit of claim 1 wherein the coupling of each of the isolator devices between the respective voltage output and converter input is controllable by a PWM controller and a switching device.

6. The circuit according to claim 1 wherein the inverter comprises a polyphase inverter.

7. The circuit according to claim 6 wherein the output of the at least one isolator device coupled between the first voltage output and the respective converter input is arranged to drive a first portion of the polyphase inverter.

8. The circuit according to claim 7 wherein the output of the at least one isolator device coupled between the second voltage output and the respective converter input is arranged to drive a second portion of the polyphase inverter.

9. The circuit according to claim 1 wherein the inverter is arranged to drive a motor.

10. The circuit according to claim 9 wherein the PWM controller is arranged to couple each isolator device in sequence to drive the motor.

11. The circuit according to claim 1 wherein the first and second voltage outputs are of equal magnitude; and/or wherein the first and second voltage outputs are of opposite polarity.

12. A method of controlling first and second control outputs of a fail-safe interface for an inverter, the method comprising:
    providing first and second switch-mode converters;
    providing each of the first and second switch-mode converters with an input voltage;

providing a converter controller of said each of the first and second switch-mode converters with power from a converter controller enable input;

coupling a semiconductor power switching device of said each of the first and second switch-mode converters between the converter input and the controller of said each of the first and second switch-mode converters;

enabling the converter controller and thereby producing a first voltage output of the first switch-mode converter and a second voltage output of the second switch-mode converter that are each of a higher magnitude than the voltage at the respective converter controller enable input and converter input;

providing at least one isolator device to produce a first control output when the at least one isolator device is coupled between the first voltage output and the first converter input; and providing at least one other isolator device to produce a second control output when the at least one other isolator device is coupled between the second voltage output and the second converter input, wherein the first and second control outputs are arranged to drive an inverter.

13. The method according to claim 12 further comprising switching the respective semiconductor power switching device with the converter controller so as to provide the respective first or second voltage output.

14. The method according to claim 12 wherein the isolator devices comprise electromagnetic devices.

15. The method according to claim 12 further comprising controlling the coupling of each of the isolator devices between the respective voltage output and converter input with a PWM controller and a switching device.

16. The method according to claim 12 wherein the inverter comprises a polyphase inverter; and wherein the output of the at least one isolator device coupled between the first voltage output and the respective converter input is arranged to drive a first portion of the polyphase inverter, and wherein the output of the at least one isolator device coupled between the second voltage output and the respective converter input is arranged to drive a second portion of the polyphase inverter.

17. The method according to claim 12 wherein the inverter is arranged to drive a motor.

18. The method according to claim 17 further wherein the PWM controller is arranged to couple each isolator device in sequence to drive the motor.

19. The method according to claim 12 wherein the first and second voltage outputs are of equal magnitude and/or wherein the first and second voltage outputs are of opposite polarity.

* * * * *